United States Patent
DeLuca et al.

(10) Patent No.: US 9,426,163 B2
(45) Date of Patent: Aug. 23, 2016

(54) COLLABORATION SPACE WITH EVENT-TRIGGER CONFIGURATION VIEWS

(71) Applicant: International Business Machines Corporation, Armonk, NY (US)

(72) Inventors: Lisa Seacat DeLuca, Baltimore, MD (US); Geetika T. Lakshmanan, Winchester, MA (US); Michael Muller, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 14/204,022

(22) Filed: Mar. 11, 2014

(65) Prior Publication Data

US 2015/0264054 A1    Sep. 17, 2015

(51) Int. Cl.
H04L 29/06    (2006.01)

(52) U.S. Cl.
CPC .......... *H04L 63/105* (2013.01); *H04L 63/101* (2013.01)

(58) Field of Classification Search
CPC .... H04L 63/105; H04L 63/102; H04L 63/101
See application file for complete search history.

(56) References Cited

U.S. PATENT DOCUMENTS

| 7,921,284 | B1* | 4/2011 | Kinghorn ............ G06F 21/6209 713/160 |
| 8,417,935 | B2 | 4/2013 | Bettger |
| 2004/0039848 | A1 | 2/2004 | Estrada et al. |
| 2007/0198714 | A1* | 8/2007 | Faden ................. G06F 21/6236 709/225 |
| 2009/0055477 | A1* | 2/2009 | Flesher ............. G06F 17/30165 709/204 |
| 2011/0010761 | A1* | 1/2011 | Doyle ................. G06F 21/6218 726/5 |
| 2012/0030733 | A1* | 2/2012 | Andrews ................. G06F 21/41 726/4 |
| 2012/0331404 | A1 | 12/2012 | Buford et al. |
| 2013/0212485 | A1 | 8/2013 | Yankovich et al. |
| 2014/0181909 | A1* | 6/2014 | Birk ...................... H04L 63/105 726/4 |
| 2014/0373104 | A1* | 12/2014 | Gaddam ............... H04L 63/105 726/4 |

OTHER PUBLICATIONS

Hu et al., "Detecting and Resolving Privacy Conflicts for Collaborative Data Sharing in Online Social Networks", Dec. 2011, ACM, pp. 103-112.*
Theepigaa et al., "Efficient and Contorlled Sharing of Privacy Data in Social Networks", 2014, IEEE, pp. 1.*
Shen et al., "Access Control for Collaborative Environments", Department of Computer Sciences, Purdue University.
Mell et al., "The NIST Definition of Cloud Computing", Version 15, Oct. 7, 2009, National Institute of Standards and Technology, Information Technology Laboratory.

* cited by examiner

*Primary Examiner* — Matthew Smithers
(74) *Attorney, Agent, or Firm* — Reza Sarbakhsh; Nidhi Garg

(57) ABSTRACT

Protecting sensitivity of information in a shared collaborative space on a computer network includes associating a set of sensitivity levels to sets of users and to sets of data elements. Access by each user to the shared collaborative space may be restricted to those data elements that have the same sensitivity level as of the user. Where multiple users join a single session, only data elements having a lowest common sensitivity level are made accessible by the users of the session.

17 Claims, 6 Drawing Sheets

US 9,426,163 B2

COLLABORATION SPACE WITH EVENT-TRIGGER CONFIGURATION VIEWS

FIELD OF THE INVENTION

The present disclosure generally relates to digital information sharing, and more particularly to access control of shared information on social networks.

BACKGROUND

Individuals and organizations use collaboration spaces to conduct work on an internal computer network. Commercial solutions exist to support a diverse set of structures that support such collaboration spaces. However, these solutions provide internal-only mechanisms, which segregate the shared spaces behind a firewall. Additionally, in instances where collaboration between two or more organizations/individuals is needed, spanning the firewall or implementing a solution outside of the firewall altogether can pose great security risks. Although information may be protected, in some instances, by identity-based access methods (e.g., usernames and passwords), confidential information may nevertheless be viewed by those who obtain these access credentials. Maintaining confidentiality of a given data goes beyond the data itself, and often includes information about the data's existence. While existing solutions provide some form of security of the data, they often fall short of protecting the data's existence altogether.

Furthermore, in solutions requiring setting up of two separate environments (one internal to a user's/organization's devices and one external), there is an increased risk of losing synchronization, efficiencies, and breakdowns in communication.

BRIEF SUMMARY

Aspects of the present disclosure provide for a method, system, and computer program product for protecting sensitive data in a shared collaborative space. A plurality of sensitivity levels are associated with each of a plurality of users and a plurality of data elements of a shared collaborative space on a computer network. Access is provided to a first data set in the plurality of data elements, by a first user among the plurality of users, wherein sensitivity levels associated with data elements of the first data set correspond to an equal or lesser sensitivity level as the sensitivity level associated with the first user.

DETAILED DESCRIPTION

Figure 1:
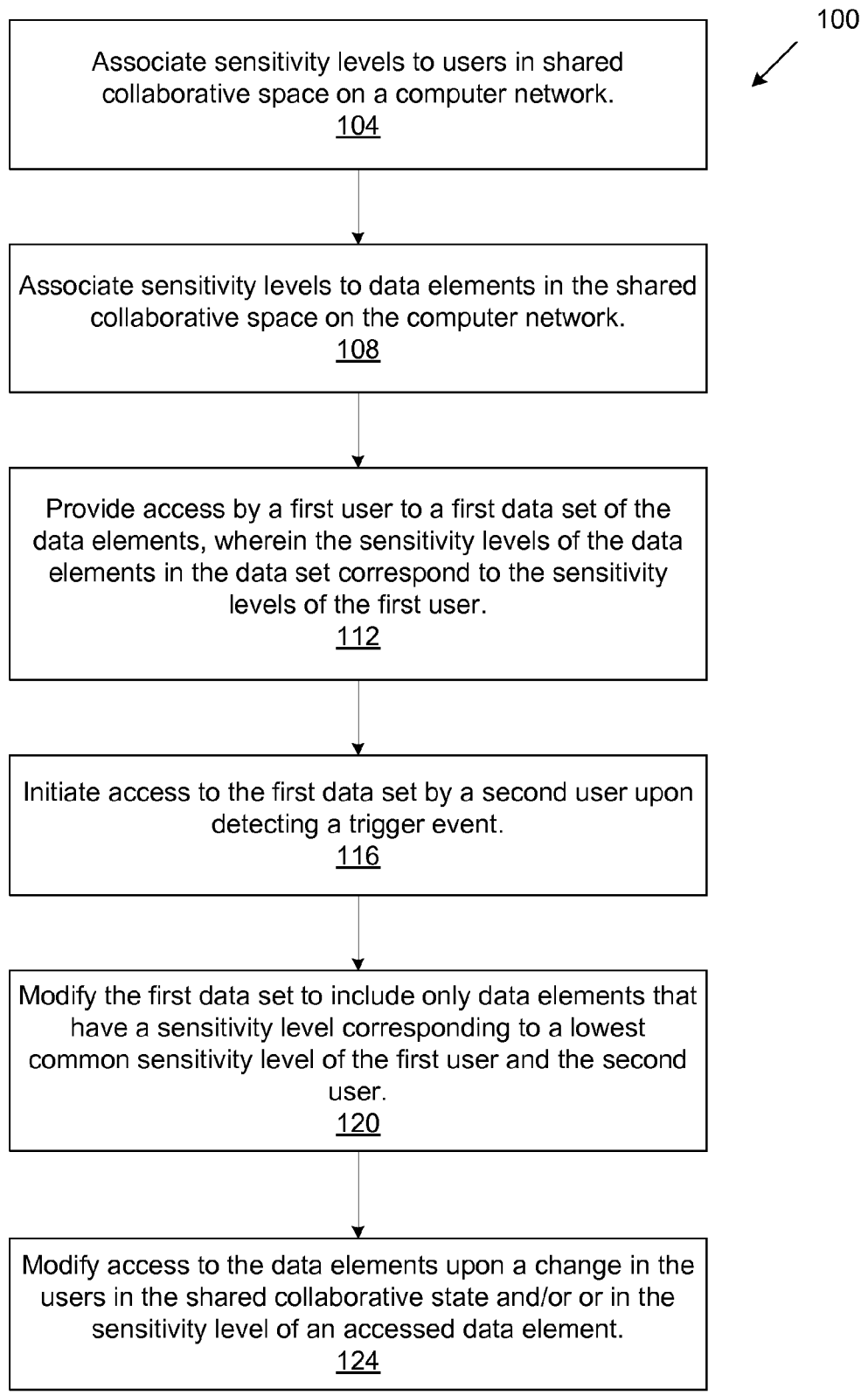
FIG. 1 is a flow chart diagram depicting steps of protecting sensitive data in a shared collaborative space, in accordance with an embodiment of the present disclosure.
Figure 2:
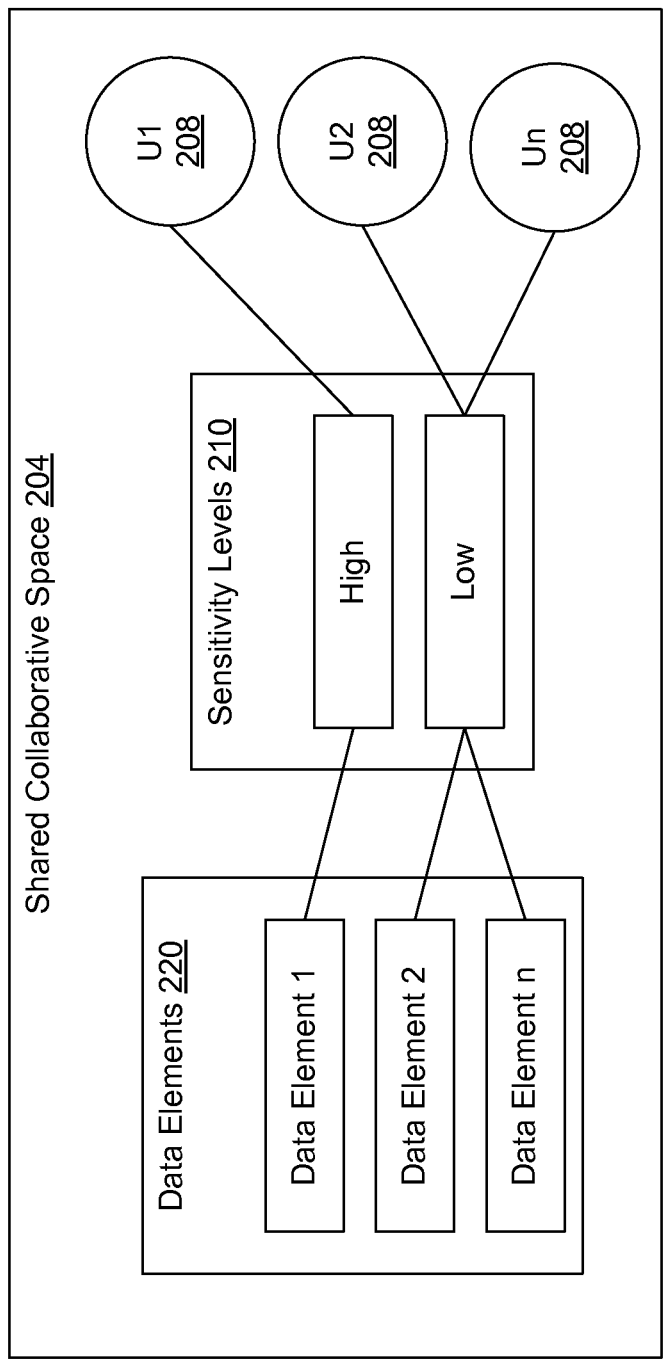
FIG. 2 is a schematic block diagram of a shared collaborative space, in accordance with an embodiment of the present disclosure.

Referring now to FIGS. 1 and 2, in an exemplary embodiment of the present disclosure, a method 100 (FIG. 1) may, in step 104 (FIG. 1), associate a plurality of sensitivity levels 210 (FIG. 2) to one or more users 208 (FIG. 2) of a shared collaborative space 204 (FIG. 2) on a computer network. The method 100 may also associate one or more of the sensitivity levels to a plurality of data elements 220 (FIG. 2) of the shared collaborative space 204, in step 108 (FIG. 1). Each of these components is described below.

The computer network (not shown) may comprise one or more operatively connected computers that may communicate with one another. The computers of the computer network may be, for example, a node and/or server of the computer network, and each may be a device as described in connection with FIG. 4.

The shared collaborative space 204 (FIG. 2) may be a collection of electronic data (e.g., the data elements 220) on the computer network to which two or more of the users 208 (FIG. 2) may have access, although it is not necessary that more than one user in fact accesses the shared collaborative space 204. As will be described below, the shared collaborative space 204 may have data elements that are not accessible by all users 208, and some data elements may be accessible to only one user 208. A feature of the shared collaborative space 204 is that it need not be protected by a firewall. In other words, access to the data elements 220 (defined in greater detail, below) is not necessarily controlled by traditional networking security measures, but is rather controlled by the shared collaborative space 204 and the defined sensitivity levels 210 (FIG. 2) of its constituent data elements 220 (FIG. 2).

The shared collaborative space 204 may be, for example:

A computer implemented social network—the social network may have a plurality of members each having access to a set of shared data, including, for example, a community or group page, a fan page, a set of multimedia documents such as photographs, videos, and audio files, or a set of textual content such as status updates. Such collections of data may be digital data on one or more computer systems/networks accessible to the members of the social network (each of which may be a user 208).

A cloud-implemented document sharing and editing platform—the platform may operate on a cloud system. It may allow for uploading of documents to the cloud system. Such documents may be, for example, word processing files, spreadsheets, presentations, photographs, audio files, or other files. The platform may provide software functionality that allows management and editing of such documents. For example, the platform may include a word processor.

An encyclopedic database—the encyclopedic database may include information and content that is organized as, for example, a set of web pages and files accessible via a browser. Each such web page may include functional code, display code, and/or content, including, without limitation, HTML and its various versions (e.g., HTML5), XML, CSS and its various versions (e.g., CSS3), JavaScript, Flash, RSS, etc.

Each of the users 208 (FIG. 2) of the shared collaborative space 204 and/or the computer network (not shown) may be, for example, a device such as a mobile device (e.g., a smart phone, a tablet computer having, for example, a touch screen, desktop computer, or another device described in connection with FIG. 4), or a natural person operating or interacting with such device via a set of user credentials, such as a username and password. The users 208 may include U1-n. The users 208 may have access and/or security credentials that facilitate their access to and communication with the shared collaborative space 204 on the computer network. These credentials may be separate from the sensitivity levels 210 defined in embodiments of the present disclosure, although this need not be the case.

Figure 3:
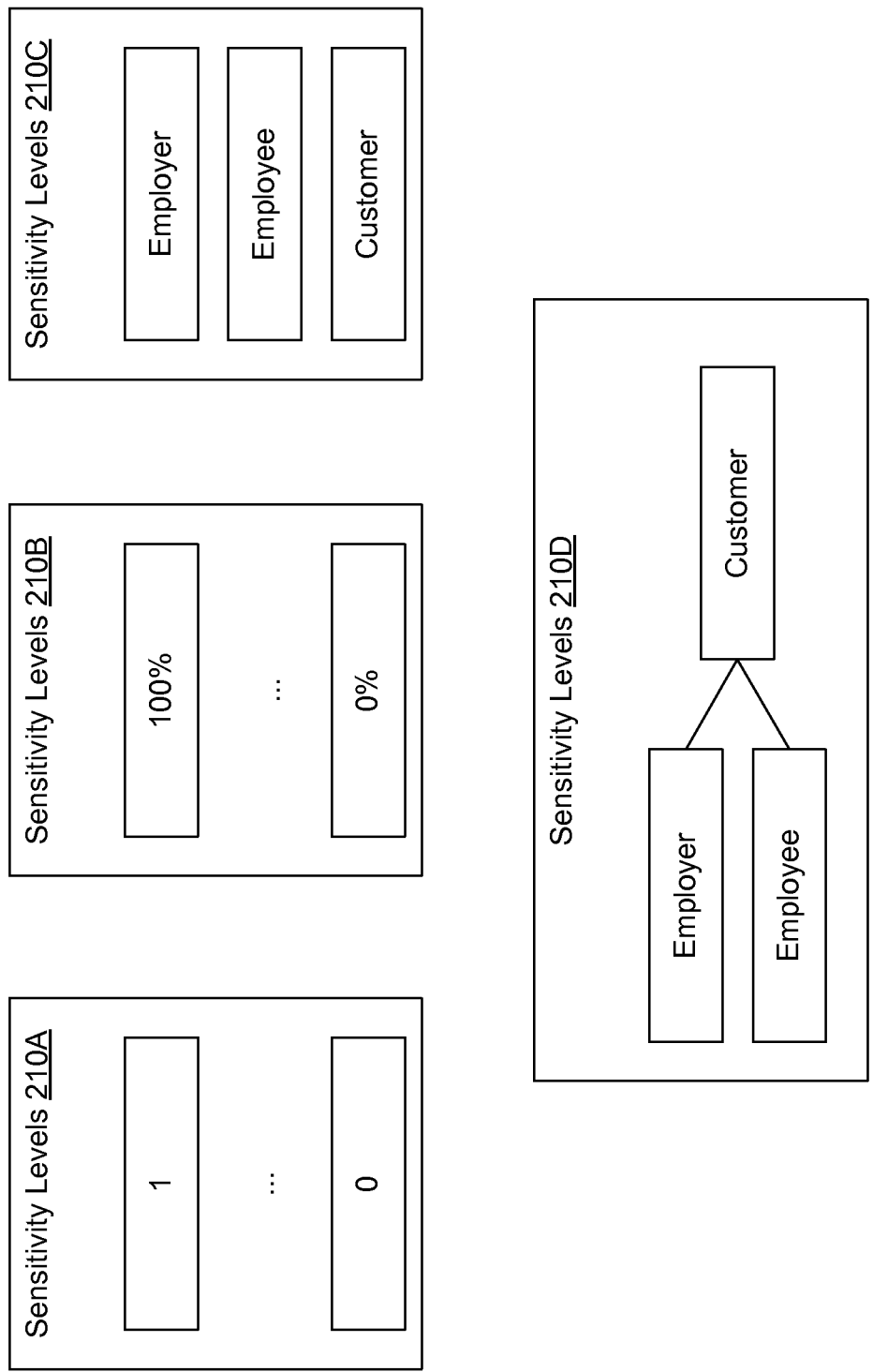
FIG. 3 is a schematic block diagram of some sensitivity levels, in accordance with an embodiment of the present disclosure.

Each of the data elements 220 (FIG. 2) and each of the users 208 (FIG. 2) may be associated with one of the defined sensitivity levels 210 (FIG. 2) or the sensitivity levels 210A-D (FIG. 3), or a combination thereof, in steps 104 and 108 of the method 100 (FIG. 1). Each of the sensitivity levels 210 (FIG. 2) may be metadata that are associated with users 208 and data elements 220 to facilitate providing access to data at varying levels of access and security. The sensitivity levels 210 may be defined differently based on the particular embodiment of the disclosure in which they are deployed. FIG. 3 depicts illustrative examples of sensitivity levels 210A-D in addition to the sensitivity level 210 depicted in FIG. 2. Each of these is exemplary, and does not limit the spirit or scope of the present disclosure. The association may be, in one embodiment, by way of specifying a sensitivity level 210 as metadata in the digital record of a data element 220. For example, if the data element 220 is an HTML document, the associated sensitivity level 210 may be specified as a new tag pair <sensitivity></sensitivity> surrounding all or a portion of the HTML document. Similarly, such metadata may be associated with a user 208 record through metadata.

These sensitivity levels 210 (FIG. 2), and 210A-D (FIG. 3) may be as follows, according to exemplary embodiments of the present disclosure:

The sensitivity levels 210 (FIG. 2) may include a binary/Boolean indicator of High and Low.

The sensitivity levels 210A (FIG. 3) may include a numeric value in a numeric range of 0-1, including decimal values. The numeric range may be any other numeric range, and may include whole numbers or real numbers. A higher number may indicate a higher level of sensitivity than a lower number, although the reverse is also possible (i.e., a low number may be used to indicate a greater sensitivity). A zero value may indicate a least sensitive level, and may be used as a default or public sensitivity value.

The sensitivity levels 210B (FIG. 3) may include a percentage value, with a higher percentage corresponding to a higher level of sensitivity (or vise versa). A 0% value may indicate a least sensitive level, and may be used as a default or public sensitivity value.

The sensitivity levels 210C (FIG. 3) may include an employer, employee, and customer sensitivity levels, with the employer having a highest sensitivity level, the employee having a moderate sensitivity level, and the customer having a lowest sensitivity level (although the reverse is also possible). The customer sensitivity level may be used as a default or public sensitivity value. Other values may be introduced into the sensitivity levels 210C. Variations include, without limitation, professional positions in a corporate hierarchy, privilege status in a legal environment, confidential status in a medical environment, and others.

The sensitivity levels 210D (FIG. 3) may include an employer and employee, as in the sensitivity levels 210C, with the difference that "customer" is a modifier of the employer and employee sensitivity levels. In this embodiment, the employer sensitivity level may be associated with a given set of data elements 220, but this association may have a less privileged access to the data elements when associated with a customer. For example, if logging into the shared collaborative space 204, the employer may indicate that a customer is present, and that information available during a session should reflect the sensitivity level of the employer as modified by a customer sensitivity modifier. Depending on how it is defined in a particular embodiment, this feature may result in making accessible a different set of data elements 220 than would otherwise be available using a stand alone customer sensitivity level as in 210C (FIG. 3).

The plurality of data elements 220 (FIG. 2) may be defined as discrete identifiable sets of data in the shared collaborative space 204. They may include, for example, Data Elements 1-n. Illustrative and non-limiting examples include: data entries in a database; documents in a data base directory; directories in a cloud or desktop operating system; paragraphs or sections in a text document; links on an HTML page; communities on a social network; postings on a forum; and entries on a list.

With continued reference to FIGS. 1-2, in step 112 of the method 100, a first user 208 (e.g., U1) may be provided access to a first data set of the data elements 220, whereby the sensitivity levels 210 of the data elements in the data set correspond to the sensitivity levels 210 of U1. According to an illustrative embodiment, U1 may be accessing a shared document on a computer terminal (e.g., U1's desktop computer). Although the document may be shared, it is not necessary that any user 208 other than U1 be accessing it at any one time. In this embodiment, U1 may be associated with a high sensitivity level 210. The set of data elements may be defined, therefore, as those that have a sensitivity level 210 equal to or lesser than the sensitivity level 210 of U1 (i.e., High and Low sensitivity data elements 220). Alternatively, only those data elements 220 that have the same sensitivity level 210 as U1 may be made accessible by U1 (this may be ideal where the sensitivity levels 210 are not defined hierarchically, but are rather defined in parallel).

In a related embodiment, sharing of access in step 112 (FIG. 1) may be by way of providing access to a screen, accessible by U1, to U2. This may be accomplished through, for example, a virtual network computing (VNC) system that allows sharing of a graphical screen and/or keyboard and mouse events from U1 to U2, or from another system to U1 and to U2.

In step 116 of the method 100, a second user's 208 (e.g., U2) access to the first data set may be initiated upon detecting a trigger event. The trigger event may be, for example, U2 joining the U1 in a meeting on the shared collaborative space 204. Other trigger events may include, without limitation: changes to the data elements 220, including changes to their sensitivity levels, and changes to the sensitivity levels of one or more users 208 including the first user and the second user. It is not necessary for the trigger event to happen at a later time than U1's access to the data elements 220. For example, U1 and U2 may both join a meeting at the same time. Accordingly, functions of the method 100 in step 116 may be performed before, concurrently with, or after steps associated with presenting U1 with a corresponding set of data elements 220.

In step 120 of the method 100 (FIG. 1), the first data set (which is made accessible to U1 in step 112) may be modified before it is presented to U2, such that the first data set, in the form that is accessible to U2, includes only those data elements 220 that correspond to U2's sensitivity level 210. In a continuation of the above presented example, U1 may be accessing a shared document on U1's desktop in U1's office. U1 may initiate a collaborative meeting which U2 joins, the meeting being hosted on the shared collaborative space 204. U1 may be presented with all data elements 220 of the shared document. The shared document may include, for example, confidential information such as social security numbers of regulated health information in a patient record (these data elements may have a High sensitivity level 210, whereas other information in the document may have a Low sensitivity level 210). Upon U2 joining the meeting, where U2 has a Low sensitivity level 210, U2 may be provided with access to only the subset of the information in the shared document that have a Low sensitivity level 210.

In an alternative illustrative example, U1 and U2 may be viewing the same document, either on the same terminal, or on a remotely shared screen. Upon detecting the trigger event, in step 120 of the method 100, the displayed content on the terminal screen or on the remotely shared screen (or the manner in which the content is otherwise made available) may be modified to include only the data elements 220 having the lowest common sensitivity level 210. In this example, only one version of the shared document is accessed by U1 and U2 at the same time. Therefore, the displaying of the content of the shared document may not be practically tailored (in this example) to each of the two users 208. Accordingly, it may be appropriate to modify the set of accessible (and/or displayed) data elements 220, such that only those data elements 220 that both users 208 have access are made accessible.

In another illustrative example, U1 may be a developer of a website, and may be demonstrating a version of the website to one or more customers/clients (i.e., U2-n) that have commissioned the development of the website. Each webpage of the website may have associated debugging information that may be suitable for viewing by U1, but not by U2-n. Accordingly, by associating the debugging information with a higher sensitivity level 210 than the other content of the website, the U1 can coordinate which information is accessible to U2-n. As part of initiating the demonstration of the website, U1 may present only the non-debugging content of the website by using the method 100, whereas the debugging information may be included in a review of the website when only U1 is accessing the website.

With continued reference to FIGS. 1-2, in another aspect of the present disclosure, in step 124 of the method 100, access to data elements 220 of the shared collaborative space 204 may be modified upon detecting a change in the shared collaborative space 204 (e.g., joining of additional users 208) and/or or a change in the sensitivity level of a data element 220. This feature enables U1 (or an administrative user), for example, to modify access to information on a dynamic basis.

Embodiments of the present disclosure allow making information available in a controlled way, while maintaining confidentiality as to the information's existence. For example, it is often as important to keep confidential the existence of a piece of information as it is to keep its actual content confidential. Existing security protocols provide for some level of security of information, but they do not present a systematic solution to keeping the existence of the information confidential.

Referring again to FIG. 2, various embodiments of the present disclosure may associate one or more of the data elements 220 in the shared collaborative space 204 with an owner (not shown). The owner may be one of the users 208, for example U1, or an administrative owner. The owner of a data element 220 may define its associations with sensitivity levels 210, and may change them over time. Other users 208 may be permitted to change the sensitivity level of a given data element 220.

Additional embodiments may include defining a public user (which may correspond to one of the users 208), having a lowest associated sensitivity level 210. Each time that access to a data set in the plurality of data elements 220 is given to one or more of the users 208, the access may be at the sensitivity level 210 associated with the public user, as a default.

With continued reference to FIG. 2, embodiments of the present disclosure may employ a mapping table (not shown), for example, in the cloud or in a centralized location that contains a hash table of usernames and their access credentials, including associated sensitivity levels 210. For example, the hash table may be: {{Alice, High}, {Bob, Low}, {Michael, All} . . . }. Upon U1's attempt to access the shared collaborative space 204 (e.g., when Alice logs into the computer network containing the shared collaborative space 204), a DB2 query, a web service invocation, or a file lookup (among other mechanisms) may be performed to obtain U1's credentials and associated sensitivity levels 210. All data elements 220 (e.g., all documents in a database) with a sensitivity level 210 higher than that of U1 are hidden from U1. U1 may not even be aware that they exist.

When multiple users 208 are logged into the shared collaborative space 204 on a single workstation or a single display screen (or accessing the collaborative space 204 in any other way where customizing access for each user 208 separately is impractical or undesirable), only data elements 220 that have an association level 210 to all logged in users 208 are made accessible. Overlapping accesses may be detected, for example, by detecting logins by multiple users in a multi-user session. Where there is no logging in (e.g., a digital presentation in a conference room), the session may be started with the public credentials described above (showing the lowest available sensitivity level 210 information), and subsequently modified as necessary by a user 208 having such modifying privileges. In this example, authentication of each user 208 (who may be a participant rather than a logged in user) is not necessary.

Figure 4:
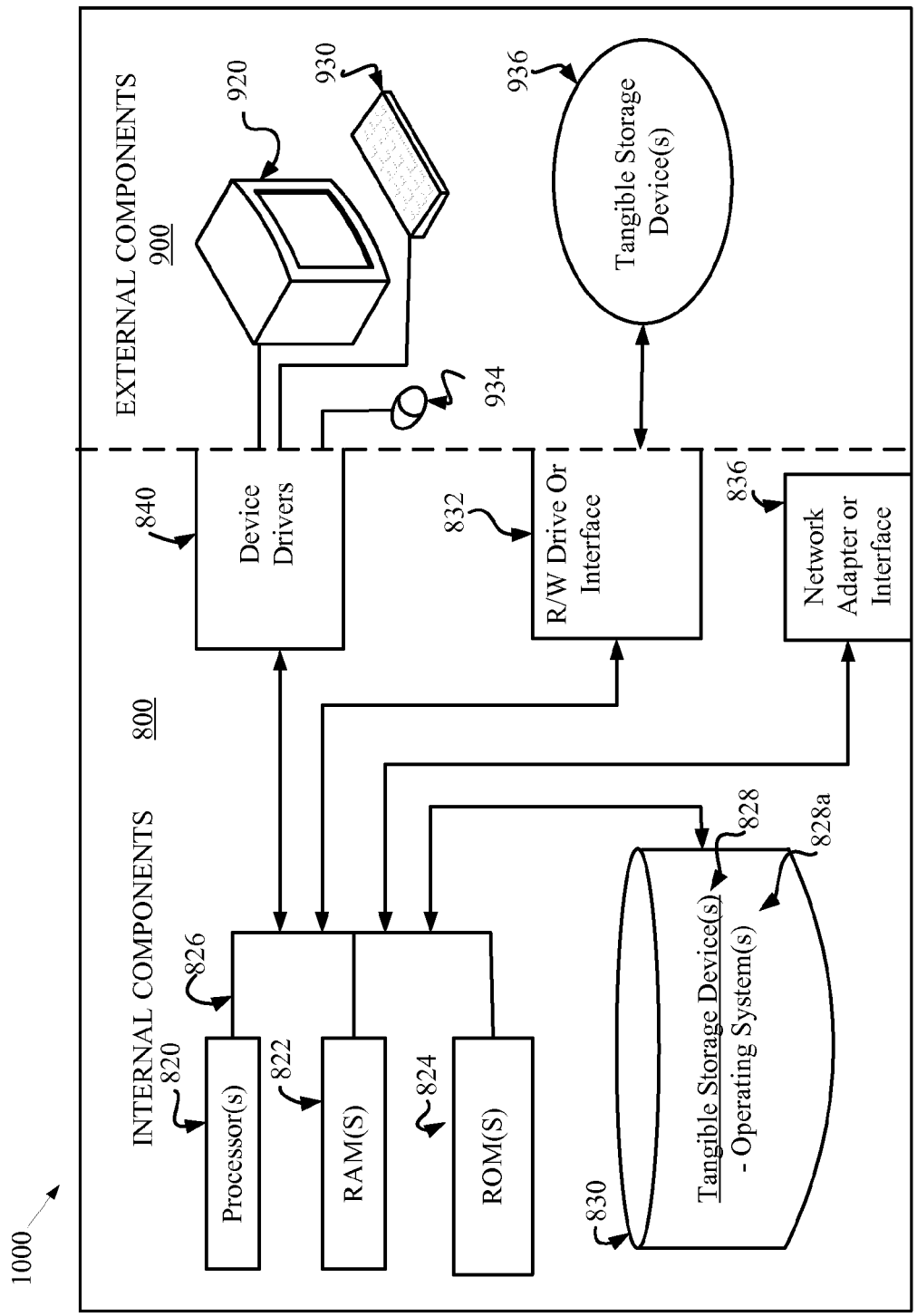
FIG. 4 is a schematic block diagram of a computer system, in accordance with an embodiment of the present disclosure.

Referring now to FIG. 4, a computing device 1000 may include respective sets of internal components 800 and external components 900. Each of the sets of internal components 800 includes one or more processors 820; one or more computer-readable RAMs 822; one or more computer-readable ROMs 824 on one or more buses 826; one or more operating systems 828; one or more software applications 828a (e.g., device driver modules) executing the method 300; and one or more computer-readable tangible storage devices 830. The one or more operating systems 828 and device driver modules 840 are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a thin provisioning storage device, CD-ROM, DVD, SSD, memory stick, magnetic tape, magnetic disk, optical disk or semiconductor storage device. The R/W drive or interface 832 may be used to load the device driver 840 firmware, software, or microcode to tangible storage device 936 to facilitate communication with components of computing device 1000.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The operating system 828 that is associated with computing device 1000, can be downloaded to computing device 1000 from an external computer (e.g., server) via a network (for example, the Internet, a local area network or wide area network) and respective network adapters or interfaces 836. From the network adapters (or switch port adapters) or interfaces 836 and operating system 828 associated with computing device 1000 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Figure 5:
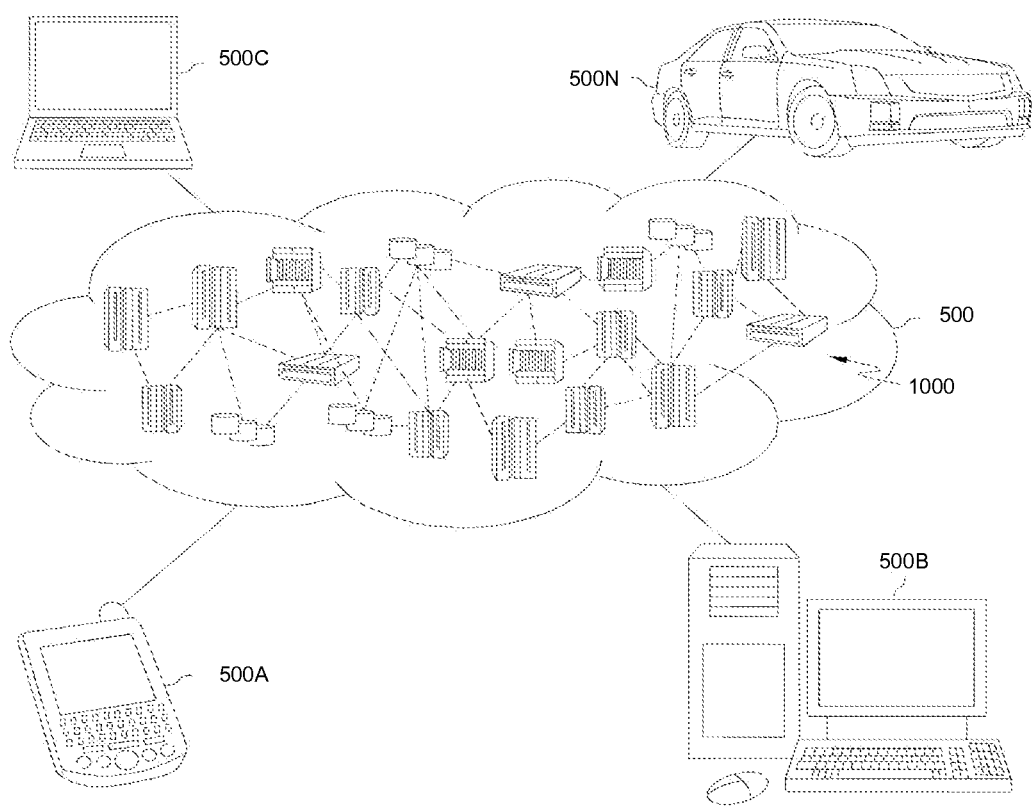
FIG. 5 is a block diagram of an illustrative cloud computing environment, in accordance with an embodiment of the present disclosure.

Referring now to FIG. 5, an illustrative cloud computing environment 500 is depicted. As shown, the cloud computing environment 500 comprises one or more cloud computing nodes, each of which may be a system 1000 with which local computing devices used by cloud consumers, such as, for example, a personal digital assistant (PDA) or a cellular telephone 500A, a desktop computer 500B, a laptop computer 500C, and/or an automobile computer system 500N, may communicate. The nodes 1000 may communicate with one another. They may be grouped (not shown) physically or virtually, in one or more networks, such as Private, Community, Public, or Hybrid clouds as described hereinabove, or a combination thereof. This allows the cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that the computing nodes 1000 and the cloud computing environment 500 can communicate with any type of computerized device over any type of network and/or network addressable connection (e.g., using a web browser).

Figure 6:
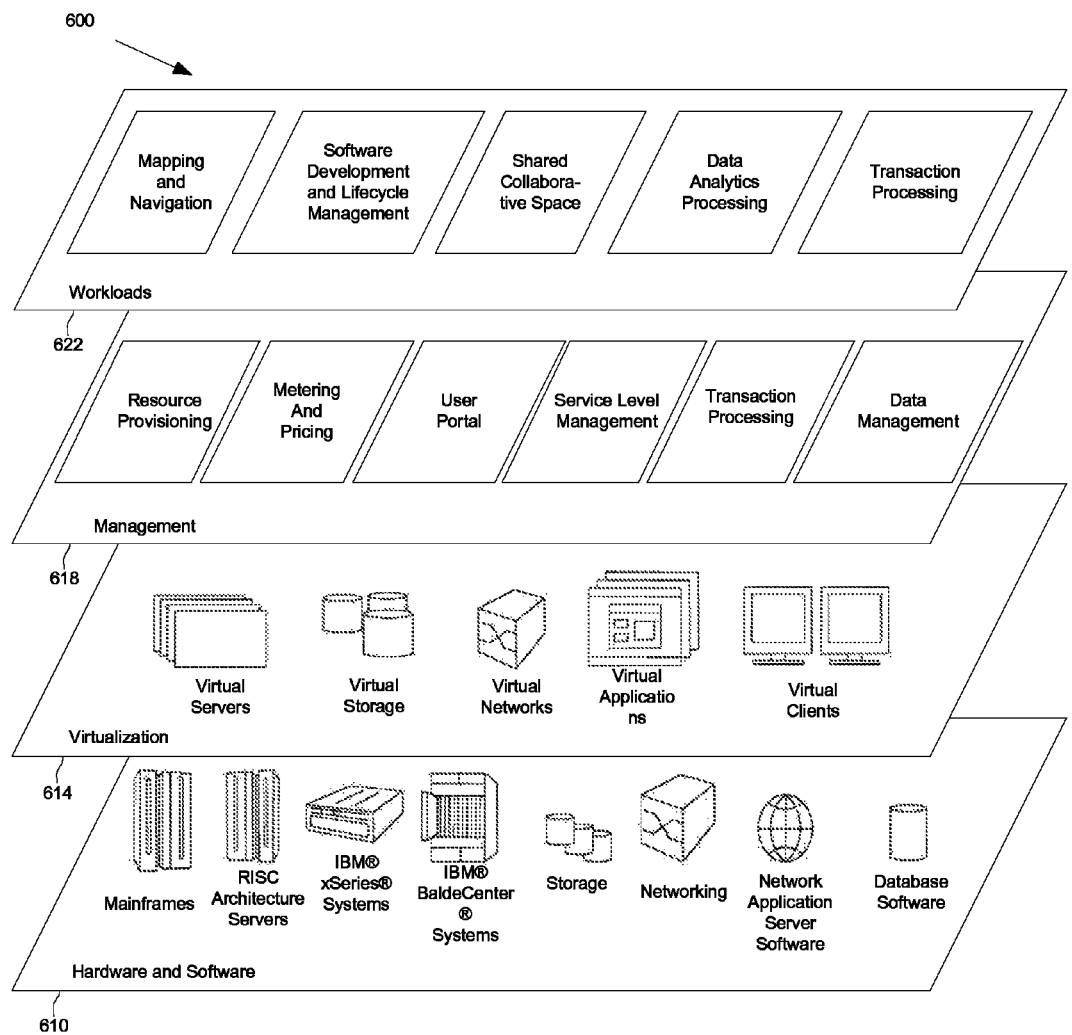
FIG. 6 is a block diagram of functional layers of the illustrative cloud computing environment of FIG. 5, in accordance with an embodiment of the present disclosure.

Referring now to FIG. 6 a set of functional abstraction layers provided by the cloud computing environment 600 (FIG. 5) is shown. It should be understood in advance that the components, layers, and functions shown in FIG. 6 are intended to be illustrative only and embodiments of the invention are not limited thereto. As depicted, the following layers and corresponding functions are provided:

The hardware and software layer 610 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

The virtualization layer 614 provides an abstraction layer from which the following examples of virtual entities may be provided: virtual servers; virtual storage; virtual networks, including virtual private networks; virtual applications and operating systems; and virtual clients.

In one example, the management layer 618 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Uportal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

The workloads layer 622 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a shared collaborative space component, such as that provided for by embodiments of the present disclosure described in FIGS. 1-4.

While the present invention is particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A computer implemented method for protecting sensitive data in a shared collaborative space, the method comprising:

associating any one or more of a plurality of sensitivity levels with any one or more of a plurality of users of a shared collaborative space on a computer network;

associating any one or more of the plurality of sensitivity levels with any one or more of a plurality of data elements of the shared collaborative space on the computer network;

providing access to a first data set in the plurality of data elements, by a first user among the plurality of users, wherein sensitivity levels associated with data elements of the first data set correspond to an equal or lesser sensitivity level as the sensitivity level associated with the first user;

detecting a trigger event corresponding to a second user;

generating a modified form of the first data set comprising data elements having a sensitivity level corresponding to a lowest common sensitivity level of the first user and the second user, and excluding data elements having a sensitivity level higher than the sensitivity level of the second user; and providing access to the modified form of the first data set by the second user.

2. The method of claim 1, wherein two or more of the plurality of sensitivity levels are hierarchically organized relative to one another.

3. The method of claim 1, wherein associating the plurality of sensitivity levels to each of the plurality of users comprises:
defining each of the plurality of sensitivity levels as metadata; and
associating the metadata of the plurality of sensitivity levels with the plurality of users and with the plurality of data elements.

4. The method of claim 1, wherein each of the plurality of data elements has a corresponding owner, the owner designating the sensitivity level of the corresponding data element in the plurality of data elements.

5. The method of claim 1, wherein the sensitivity level is any one of a Boolean indicator and a number.

6. The method of claim 1, wherein the trigger event comprises one or more users logging into the shared collaborative space.

7. A computer system for protecting sensitive data in a shared collaborative space, comprising:
a computer having a processor and a tangible storage device;
a program embodied on the tangible storage device for execution by the processor, the program having a plurality of program instructions for execution by the processor, the program instructions comprising instructions for:
associating any one or more of a plurality of sensitivity levels with any one or more of a plurality of users of a shared collaborative space of a computer network;
associating any one of more of the plurality of sensitivity levels with any one or more of a plurality of data elements of the shared collaborative space on the computer network;
providing access to a first data set in the plurality of data elements, by a first user among the plurality of users, wherein sensitivity levels associated with data elements of the first data set correspond to an equal or lesser sensitivity level as the sensitivity level associated with the first user;
detecting a trigger event corresponding to a second user;
generating a modified form of the first data set comprising data elements having a sensitivity level corresponding to a lowest common sensitivity level of the first user and the second user, and excluding data elements having a sensitivity level higher than the sensitivity level of the second user; and
providing access to the modified form of the first data set by the second user.

8. The system of claim 7, wherein at least one of the plurality of users is a mobile device.

9. The system of claim 7, wherein at least one of the plurality of users is a desktop computer.

10. The system of claim 7, wherein providing access comprising displaying data on a display.

11. The system of claim 7, wherein detecting the trigger event includes detecting an input to the computer including any one or more of:
a pressing of a key stroke on a keyboard of the computer;
a clicking of a mouse button where a corresponding pointer of the mouse appears over a graphical user interface component of the computer; and
a pressing of a touch screen of the computer.

12. A computer program product for protecting sensitive data in a shared collaborative space, the computer program product comprising a tangible storage device having program code embodied therewith, the program code executable by a processor of a computer to perform a method, the method comprising:
associating, by the processor, any one or more of a plurality of sensitivity levels to any one or more of a plurality of users of a shared collaborative space on a computer network;
associating, by the processor, any one or more of the plurality of sensitivity levels to any one or more of a plurality of data elements of the shared collaborative space on the computer network;
providing access, by the processor, to a first data set in the plurality of data elements, by a first user among the plurality of users, wherein sensitivity levels associated with data elements of the first data set correspond to an equal or lesser sensitivity level as the sensitivity level associated with the first user;
detecting, by the processor, a trigger event corresponding to a second user;
generating, by the processor, a modified form of the first data set comprising data elements having a sensitivity level corresponding to a lowest common sensitivity level of the first user and the second user, and excluding data elements having a sensitivity level higher than the sensitivity level of the second user; and
providing, by the processor, access to the modified form of the first data set by the second user.

13. The computer program product of claim 12, wherein the access provided to the second user includes access via a screen sharing protocol.

14. The computer program product of claim 12, wherein the access provided to the second user includes access via a file sharing protocol.

15. The computer program product of claim 12, wherein the shared collaborative space includes a document editing platform.

16. The computer program product of claim 12, wherein the collaborative space includes a directory of documents.

17. The computer program product of claim 12, wherein the shared collaborative space is a social network.

* * * * *